US011573797B2

United States Patent
Tu et al.

(10) Patent No.: US 11,573,797 B2
(45) Date of Patent: *Feb. 7, 2023

(54) COMPUTING 2-BODY STATISTICS ON GRAPHICS PROCESSING UNITS (GPUS)

(71) Applicant: UNIVERSITY OF SOUTH FLORIDA, Tampa, FL (US)

(72) Inventors: Yicheng Tu, Tampa, FL (US); Napath Pitaksirianan, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/474,828

(22) Filed: Sep. 14, 2021

(65) Prior Publication Data
US 2022/0075620 A1 Mar. 10, 2022

Related U.S. Application Data

(63) Continuation of application No. 16/521,852, filed on Jul. 25, 2019, now Pat. No. 11,119,771.
(Continued)

(51) Int. Cl.
G06F 17/13 (2006.01)
G06F 9/30 (2018.01)

(52) U.S. Cl.
CPC ...... *G06F 9/30098* (2013.01); *G06F 9/30043* (2013.01)

(58) Field of Classification Search
None
See application file for complete search history.

(56) References Cited

U.S. PATENT DOCUMENTS 6,452,595 B1 9/2002 Montrym et al.
8,745,059 B1* 6/2014 Jing .................... G06F 16/5838
707/737

(Continued)

OTHER PUBLICATIONS

Agrawal et al., Pairwise Statistical Significance of Local Sequence Alignment Using Sequence-Specific and Position-Specific Substitution Matrices, IEEE/ACM Transactions on Computational Biology and Bioinformatics, 2011, 8 (1):194-205.
(Continued)

*Primary Examiner* — Hyun Nam
(74) *Attorney, Agent, or Firm* — Quarles & Brady LLP (57) ABSTRACT

Disclosed are various embodiments for computing 2-body statistics on graphics processing units (GPUs). Various types of two-body statistics (2-BS) are regarded as essential components of data analysis in many scientific and computing domains. However, the quadratic complexity of these computations hinders timely processing of data. According, various embodiments of the present disclosure involve parallel algorithms for 2-BS computation on Graphics Processing Units (GPUs). Although the typical 2-BS problems can be summarized into a straightforward parallel computing pattern, traditional wisdom from (general) parallel computing often falls short in delivering the best possible performance. Therefore, various embodiments of the present disclosure involve techniques to decompose 2-BS problems and methods for effective use of computing resources on GPUs. We also develop analytical models that guide users towards the appropriate parameters of a GPU program. Although 2-BS problems share the same core computations, each 2-BS problem however carries its own characteristics that calls for different strategies in code optimization. Accordingly, various embodiments of the present disclosure involve a software framework that automatically generates
(Continued)

high-performance GPU code based on a few parameters and short primer code input.

18 Claims, 6 Drawing Sheets

Related U.S. Application Data (60) Provisional application No. 62/738,228, filed on Sep. 28, 2018.

(56) References Cited

U.S. PATENT DOCUMENTS

| | | | | |
|---|---|---|---|---|
| 11,119,771 | B2* | 9/2021 | Tu | G06F 9/30043 |
| 2004/0111587 | A1* | 6/2004 | Nair | G06F 9/30036 |
| | | | | 712/E9.067 |
| 2006/0204119 | A1 | 9/2006 | Feng et al. | |
| 2007/0192066 | A1* | 8/2007 | Ide | G06F 17/18 |
| | | | | 702/179 |
| 2007/0268297 | A1 | 11/2007 | Novosad | |
| 2009/0030663 | A1* | 1/2009 | Lu | G06F 30/20 |
| | | | | 703/4 |
| 2009/0251475 | A1 | 10/2009 | Mathur et al. | |
| 2010/0328326 | A1 | 12/2010 | Hervas et al. | |
| 2014/0002466 | A1* | 1/2014 | Paragios | G06T 7/11 |
| | | | | 345/503 |
| 2014/0074767 | A1* | 3/2014 | Horwood | B64G 3/00 |
| | | | | 706/52 |
| 2019/0042245 | A1* | 2/2019 | Toll | G06F 12/0607 |
| 2019/0278596 | A1* | 9/2019 | Leven | G06F 11/1048 |
| 2020/0104134 | A1* | 4/2020 | Tu | G06F 9/5027 |
| 2022/0075620 | A1* | 3/2022 | Tu | G06F 9/30043 |

OTHER PUBLICATIONS

Chen et al., Performance Analysis of a Dual-Tree Algorithm for Computing Spatial Distance Histograms, The VLDB Journal, 2011, 20(4):471-494.

Grupcev et al., Approximate Algorithms for Computing Spatial Distance Histograms with Accuracy Guarantees, IEEE Transactions on Knowledge and Data Engineering, 2013, 25(9):1982-1996.

Hairu et al., Exploring a Method for Ranking Objects Based on Pairwise Comparison, In 2011 Fourth International Joint Conference on Computational Sciences and Optimization, IEEE, pp. 382-386.

He et al., Relational Joins on Graphics Processors, In Proceedings of the 2008 ACM SIGMOD International Conference on Management of Data, pp. 511-524.

Jensen et al., A Predictive Model of Music Preference Using Pairwise Comparisons, In 2012 IEEE International Conference on Acoustics, Speech and Signal Processing (ICASSP), pp. 1977-1980.

Jiang et al., Learning Pairwise Comparisons of Items with Bigram Content Features for Recommending, In Proceedings of 2013 3rd International Conference on Computer Science and Network Technology, pp. 446-449.

Khronos Group Inc., OpenCL Overview—The Open Standard for Parallel Programming of Heterogeneous Systems, Copyright The Khronos Group Inc. 2019, 8 pages.

Kumar et al., Computing Spatial Distance Histograms for Large Scientific Data Sets On-the-Fly, IEEE Transactions an Knowledge and Data Engineering, 2014, 26(10):2410-2424.

Levine et al., Fast Analysis of Molecular Dynamics Trajectories with Graphics Processing Units—Radial Distribution Function Histogramming, Journal of Computational Physics, 2011, 230(9):3556-3569.

Li et al., Performance Modeling in CUDA Streams—A Means for High-Throughput Data Processing, In 2014 IEEE International Conference on Big Data, pp. 301-310.

Nyland et al., Chapter 31—Fast N-Body Simulation with CUDA, PU Gems 3,2007, pp. 677-695.

Pitaksirianan et al., Efficient 2-Body Statistics Computation on GPUs: Parallelization & Beyond, In 2016 45th International Conference on Parallel Processing (ICPP), IEEE, pp. 380-385.

Pitaksirianan et al., Algorithms and Framework for Computing 2-body Statistics on GPUs, Distributed and Parallel Databases, 2019, 37(4):587-622.

Ponce et al., Application of GPUs for the Calculation of Two Point Correlation Functions in Cosmology, Astronomical Data Analysis Software and Systems XXI, ASP Conference Series, vol. 461, 2012, pp. 73-76.

Rokach et al., Initial Profile Generation in Recommender Systems Using Pairwise Comparison, IEEE Transactions on Systems, Man, and Cybernetics, Part C: Applications and Reviews, 2012,42(6):1854-1859.

Rui et al., Join Algorithms on GPUs: A Revisit After Seven Years, In 2015 IEEE International Conference on Big Data (Big Data), pp. 2541-2550.

Shams et al., Efficient Histogram Algorithms for NVIDIA CUDA Compatible Devices, In Proc. Int. Conf. on Signal Processing and Communications Systems (ICSPCS), 2007, pp. 418-422.

Stratton et al., Algorithm and Data Optimization Techniques for Scaling to Massively Threaded Systems, Computer, 2012, 45(8):26-32.

Tu et al., Computing Spatial Distance Histograms Efficiently in Scientific Databases, Depailment of Computer Science and Engineering, University of South Florida, 2008, 23 pages.

Wang et al., Communication Optimization on GPU: A Case Study of Sequence Alignment Algorithms, In 2017 IEEE International Parallel and Distributed Processing Symposium (IPDPS), pp. 72-81.

Wong et al., Demystifying GPU Microarchitecture Through Microbenchmarking, In 2010 IEEE International Symposium on Performance Analysis of Systems & Software (ISPASS), pp. 235-246.

* cited by examiner

COMPUTING 2-BODY STATISTICS ON GRAPHICS PROCESSING UNITS (GPUS)

CROSS-REFERENCE TO RELATED APPLICATIONS

This application is a continuation of U.S. patent application Ser. No. 16/521,852, filed Jul. 25, 2019, which claims priority to, and the benefit of, U.S. Provisional Patent Application No. 62/738,228, entitled "COMPUTING 2-BODY STATISTICS ON GRAPHICS PROCESSING UNITS (GPUs)" and filed on Sep. 28, 2018, each of which is incorporated by reference as if set forth herein in its entirety.

NOTICE OF GOVERNMENT-SPONSORED RESEARCH

Government sponsorship notice: This invention was made with government support 1253980 awarded by the National Science Foundation. The Government has certain rights in the invention.

BACKGROUND

Handling analytical workloads efficiently is a major challenge in today's scientific domains. Recent studies show increasing interest in developing database systems for handling scientific data. Traditional database management systems (DBMSs) still fall short of algorithms and strategies to satisfy the special needs of scientific applications, which are very different from those in traditional databases in their data types and query patterns. In addition, design of efficient algorithms for data query and analysis are still the main challenge in scientific areas. In addition, support of complex mathematical functions in DBMS have become an active research area.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for calculating 2-body statistics using a graphics processing unit (GPU). Bearing many forms and definitions, 2-body statistics (2-BS) are a type of computational pattern that evaluates all pairs of points among an N-point data set. Therefore, in relational algebraic terms, a 2-BS is essentially a Cartesian product between two datasets (or two instances of the same dataset) followed by a user-defined aggregate. There are numerous examples of 2-BS problems: 2-tuple problem, all-point nearest-neighbor problem, kernel density regression, two-point angular correlation function, 2-point correlation function, and spatial distance histogram (SDH), among others. Another flavor of 2-BS problem takes two datasets as input, such as radial distribution function (RDF) and relational joins. Moreover, there are many computing applications that requires pairwise comparison among all data points, such as item rating with pairwise comparison, Cosine similarity, predictive of music preference, ranking with pairwise comparison, and N-body simulation.

In general, a 2-BS can be computed by solving a distance function between all pairs of datum. Although the distance function only demands constant time to compute for a pair of data points, the total running time is quadratic to the data size. Parallel computing techniques, such as those discussed in further detail herein, can be utilized to speed up the computation in practice. In the context of 2-BS problems, parallel computing techniques are extremely useful for two reasons. First, particular types of 2-BS lack efficient algorithms for calculating the solutions. For example, kernel functions for Support Vector Machine (SVM) and pairwise comparison in various applications can only be solved in quadratic time. Another example is relational joins—although sort-merge, hash, and index-based algorithms are preferred for processing equi-joins, nested-loop join is the better choice for joins with complex non-equality conditions. Second, performance of more advanced algorithms can be further improved via parallelization. For example, efficient join algorithms such as hash join still require complete pairwise comparison of data (e.g., within the same bucket of the hash table), for which parallel programs have shown great success. Accordingly, the present disclosure involves techniques to implement and optimize parallel algorithms for computing 2-BSs on modern Graphics Processing Units (GPUs).

By providing massive computing power and high memory bandwidth, GPUs have become an integrated part of many high-performance computing (HPC) systems. Originally designed for graphics processing, the popularity of general-purpose computing on GPUs (GPGPU) has boosted in recent years with the development of software frameworks such as Compute unified device architecture (CUDA) and Open Computing Language (OpenCL). Due to the compute-intensive nature of 2-BS problems and the fact that the main body of computations can be done in a parallel manner for most 2-BSs, GPUs stand out as desirable platform for implementing 2-BS algorithms.

However, there are few GPU algorithms, and for only a few 2-BS problems. In addition to the lack of GPU approaches, existing work lacks a comprehensive study of the techniques to achieve high performance on GPUs. This is a non-trivial task because code optimization has to consider architectural and system software features of modern GPUs that are more complex than those in multi-core CPUs. As a result, traditional approaches to parallel computing often fall short in delivering the best possible performance. Accordingly, various embodiments of the present disclosure involve techniques to decompose 2-BS problems and methods for effective use of computing resources on GPUs. These techniques include warp-level privatization, warp-level load balancing, and shuffle-enhanced tiling. In the following discussion, a general description of the system and its components is provided, followed by a discussion of the operation of the same.

To begin, there are at least two phases in computing typical 2-BS problems: a pairwise data processing phase, and a result outputting phase. In the first phase, various tiling methods and use of different types of GPU cache to reduce data access latency on global memory can be used. For the output phase, privatization and summation of output can be used to reduce synchronization. As a result, the design of highly-optimized 2-BS algorithms that significantly outperform the best known GPU and CPU implementations can be achieved.

In addition, it is noted that configuration of run-time parameters for the GPU programs has significant effects on performance. For that, analytical models that guide towards the best choices of key parameters of our program are disclosed. These analytical models allow for performance guarantees when implementing 2-BS algorithms.

The basic algorithm design can also be extended to the scenarios of input data being larger than global memory and utilization of multiple GPUs towards high scalability. This involves splitting the input into small blocks and pipelining data transmission with in-core computation.

Although the 2-BS problems considered share the same core computations, each 2-BS problem however carries its own characteristics that calls for different strategies in code optimization. For that, a software framework is provided that allows for computing a large group of problems that show similar data access and computational features as those found in typical 2-BSs. In this framework, core computational kernels are implemented and output optimized GPU code is developed based on a few parameters and a distance function given by a user.

As mentioned earlier, a 2-BS is referred to as a computational pattern that evaluates all pairs of points among an N-point dataset. This computation pattern can be done either within a single dataset, or between two datasets. For every pair of data points, a 2-BS computes a distance function between the pair. By iterating over all of the pairs, the problem can be solved with total complexity $O(N^2)$.

The 2-BS type of functions are found popular in many scientific domains, with numerous concrete examples. The following are names of 2-BS that compute all pairs of points within a single dataset: 2-tuple problem, all-point nearest-neighbor problem, pairwise comparisons for time series motifs, nonparametric outlier detection and denoising, kernel density regression, two-point angular correlation function, 2-point correlation function, and spatial distance histogram (SDH), to name a few. Another flavor of 2-Body statistic takes two different datasets as input, examples include Radial distribution function (RDF) and relational joins. However, there are many other types of 2-BS problems beyond these examples.

In practice, there are many applications of 2-BS problems. A common practice in many application domains is to use various distance measures (e.g., Euclidean, Jaccard, and cosine distance) to find the similarity of all pairs of input datum. One example is recommendation systems for online advertising that predict the interest of customers and suggests correct items. Another example is a music predictive model based on pairwise comparisons of Gaussian process priors between music pieces. There are two types of recommendation systems: content-based filtering (CB) and collaborative filtering (CF). Both require 2-BS computation: CB depends on pairwise comparisons between items and CF depends on those between users.

Algorithm 1: Generic CPU-based 2-BS algorithm

Local Var: t (Thread id)
1: currentPt ← input[t]
2: for i = t + 1 to N do
3:     d ← DisFunction(currentPt, input[i])
4:     update output with d
5: end for Note the pseudocode is written from the perspective of a single thread, reflecting the Single-Program-Multiple-Data (SPMD) programming style of some GPGPU programming frameworks. Each thread loads one datum to a local variable, and uses that to loop through the input dataset to find other data points for the distance function computation. The output will be updated with the results of each distance function computation.

To optimize the above 2-BS algorithm, the challenges can be roughly summarized as those in dealing with the input and output data, respectively. First, each input datum i will be read many times (by different threads into registers) for the distance function computation. Therefore, the strategy is to push the input data into the cache as much as we can. The many types of cache in GPUs, however, complicates the problem. Second, every thread needs to read and update the output data at the same time. Updating the output data simultaneously might cause incorrect results. Some recent GPUs and GPGPU software frameworks provide atomic instructions to ensure correctness under concurrent access to global and shared memory locations. However, an atomic instruction also means sequential access to the protected data lowers performance. As a result, collisions should be avoided as much as possible.

2-BS cases can be characterized based on the computational paths. This helps to determine the proper combination of techniques to use for optimizing individual 2-BS problems. For example, many 2-BS problems are very similar at the point-to-point distance function computation stage. However, members of the 2-BS family tend to have very different patterns in the data output stage. However, there are at least three types of 2-BS problems.

Type-I: 2-BS members of this group generate a very small amount of output data from each thread. These output must be small enough to be placed in registers for each thread. For example, 2-point correlation function, which is fundamental in astrophysics and biology, outputs a number of pairs of points that determine correlation in dataset. Other examples are all-point k-nearest neighbors (when k is small) and Kernel density/regression, which output classification results or approximation numbers from regression.

Type-II: The output of 2-BS members in this group is too big for registers, but still small enough to be put into a GPUs' shared memory. Examples include: (1) Spatial distance histogram (SDH), which outputs a histogram of distances between all pairs of points; and (2) Radial distribution function (RDF), which outputs a normalized form of SDH.

Type-III: In this group, the size of the output of 2-BS problems can be so large that the output can only be put into global memory. In some extreme cases, the size of the output is quadratic to the size of input. Some examples are: (1) relational join, which outputs concatenated tuples from two tables–total number of output tuples can be quadratic (especially in non-equality joins); (2) Pairwise Statistical Significance, which is statistical significance of pairwise alignment between two datasets and generates large output; and (3) Kernel methods which compute kernel functions for all pairs of data in the feature space.

To elaborate on the GPU algorithm design, the data structures for loading input data should be considered. First of all, the input data is stored in the form of multiple arrays of single-dimension values instead of using an array of structures that each holds a multi-dimensional data point. This will ensure coalesced memory access when loading the input data. Moreover, each dimension array can be vectorized by loading multiple floating point coordinate values in one data transmission unit. In particular embodiment, one can use the float2, float3, and float4 data types supported in CUDA for such purposes. This reduces the number of memory transactions and thus the number of load instructions in code. Furthermore, vectorized memory access also indirectly increases instruction level parallelism (ILP) by unrolling a loop to calculate all pairwise distances between two vectors. Thus, in the remainder of this paper, a datum means a vector of multiple data points. Also a distance function call between two datum actually computes all pairwise distances.

As mentioned above, GPGPU frameworks often support a number of vector floating point data types to store multiple floating point values simultaneously. In general, a wider vector yields higher memory bandwidth utilization, but also increases register use in the kernel, which in turn reduces warp occupancy. Therefore, an appropriate balance point between register usage and memory bandwidth should be considered.

There are a number of design strategies in the pairwise distance function computation stage. The input data is stored in the form of multiple arrays of single-dimension values instead of using an array of structures that each holds a multi-dimensional data point. Moreover, each dimension array can be vectorized by a vector of two elements. This can cause memory access to be coalesced when loading the input data. While naïve approaches (e.g., as outlined in Algorithm 1 above) may load one input to the distance function from the global memory, there are $O(N^2)$ total distance calls. Due to the high latency of data transferring between the global memory and cores, the goal is to reduce the number of data reads from global memory. In particular, a tiling method may be used to load data from the global memory to on-chip cache. Whenever two data points are used as inputs to the distance function, they are retrieved from cache instead of the global memory.

Figure 1:
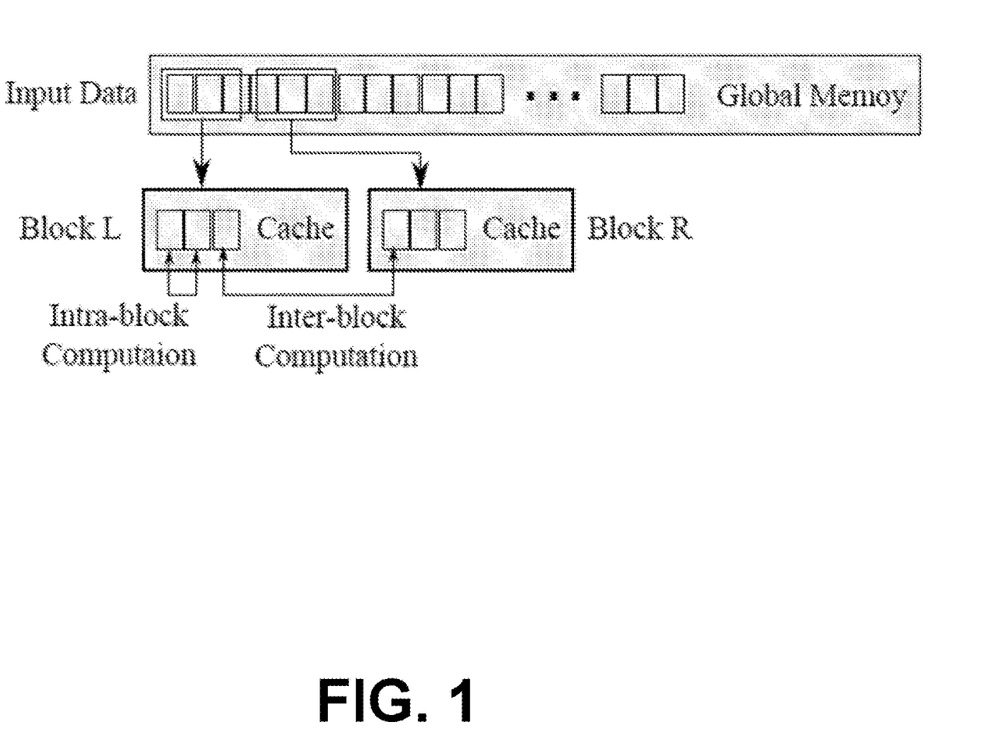
FIG. 1 is a drawing depicting one of several embodiments of the present disclosure.

FIG. 1 illustrates the tiling approach. Input data is divided into small blocks, and the size of a block ensures it can be put into cache. Normally, the data block size is the same as the number of threads in each block. Each thread loads one vector of input data into the cache to ensure coalesced access to the global memory. With blocks of data loaded to cache, the main operation of the algorithm is now to compute distance function between two different blocks of data (inter-block computation). Each thread block first loads an anchor block L, and loads a series of other blocks R. Then, distance functions between all pairs of datum of inter and intra blocks are computed. Algorithm 2 shows the pseudo code for an implementation of the tiling-based algorithm.

---
Algorithm 2: Block-based 2-BS computation
---
Local Var: t (Thread id), b (Block id)
Global Var: B (Block size), M (total number of blocks)
1:  L ← the b-th input data block loaded to cache
2:  for i = b + 1 to M do
3:      R ← the i-th input data block loaded to cache
4:      syncthreads( )

---
Algorithm 2: Block-based 2-BS computation
---
5:      for j = 0 to B do
6:          d ← DisFunction(L[t], R[j])
7:          update output with d
8:      end for
9:  end for
10: for i = t + 1 to B do
11:     d ← DisFunction(L[t], L[i])
12:     update output with d
13: end for To implement the above algorithm, a decision needs to be made: which cache is used to hold both blocks L and R? There is no straightforward answer since there are multiple cache systems in the GPUs provided by various vendors. By ignoring the non-programmable L2 cache, there is still the programmable shared memory and read-only data cache (RoC), both of which may have Terabyte-per-second (TBps) level bandwidth and a response time of just a few clock cycles. As programmable shared memory tends to have the lowest latency in GPUs (e.g., about 21 clock cycles in NVIDIA's MAXWELL® architecture), the shared memory may be sufficient to use to hold both blocks L and R. For purposes of the subsequent discussion, this technique is referred to as "LRshm."

By taking a closer look at Algorithm 2, one can notice that each datum will have to be placed into registers before it can be accessed by the distance function, and each thread only accesses a particular datum throughout its lifetime. Therefore, it is more efficient by defining a local variable for each data member of block L, which can be stored and accessed in registers. This will reduce the consumption of shared memory in each thread, which is a bottlenecking resource in implementations with a large data output. An addition benefit of using variables that can be stored in registers is the reduction in the latency of accessing the variable. In some hardware implementations, the latency of accessing registers is just one clock cycle. However, the same argument does not hold true for block R: all data in block R is meant to be accessed by all threads in the block but a register is private to each thread. Therefore, block R has to be loaded into cache. Accordingly, another technique, named Register-SHM, can be used to improve LRshm by using registers to hold one datum from block L, and allocating shared memory to hold block R.

Another solution that further relieves the bottleneck of shared memory by storing the block in RoC can be used. Although this solution may not yield higher performance in the distance computation stage, it is meaningful if shared memory has to be used for other demanding operations (e.g., outputting results). This solution basically does not change the code structure of the second solution (with use of registers). However, the RoC can be used instead of shared memory to store blocks R (for inter-block computation) and L (for intra-block computation). RoC has higher latency than the shared memory (e.g., about 64 clock cycles higher in NVIDIA MAXWELL) but it is still an order of magnitude faster than global memory. However, RoC is not fully programmable as the shared memory. To address this issue, the variable can be stored into the RoC.

Analytical Evaluation: In order to robustly compare the performance of the proposed algorithms, we present an analytical model of the number of accesses to different types of GPU memories during the execution of these algorithms. The Naive algorithm does not benefit from shared memory and RoC, and just uses global memory. The number of accesses to global memory for this algorithm is:

$$N + \sum_{i=1}^{N-1}(N-i) \quad (1)$$

Since each access costs the highest latency compared to other memory on GPU, this algorithm is very costly. However, other improved algorithms take advantage of faster cache and yield better performance. SHM-SHM and Register-SHM both use shared memory plus global memory, and Register-RoC uses RoC and global memory. These three mentioned algorithms have the same number of accesses to global memory, which equals to:

$$N + \sum_{i=1}^{M-1}(M-i)B \quad (2)$$

Having the same number of accesses to global memory, we should consider other memory accesses for the sake of comparison. In SHM-SHM algorithm, number of accesses to shared memory is:

$$2\sum_{i=1}^{M-1}(M-i)B^2 + 2\sum_{i=1}^{B-1}(B-i)M \quad (3)$$

In Register-SHM algorithm, the number of accesses to shared memory is:

$$\sum_{i=1}^{M-1}(M-i)B^2 + \sum_{i=1}^{B-1}(B-i)M$$

Considering the number of accesses to shared memory by SHM-SHM and Register-SHM algorithms, the Register-SHM decreased the number accesses quite considerably, dropping by half from SHM-SHM, which is why it is faster than SHM-SHM. On the other hand, the Register-RoC algorithm exploits data cache instead of shared memory and the number of accesses to this memory is the same as the number of accesses of Register-SHM to share memory. Considering corresponding access time of each GPU memory and the number of accesses to that memory by each algorithm, it's clear that Register-SHM outperforms the others.

Empirical Evaluation: To evaluate the performance of the aforementioned solutions in distance computation, they were implemented in CUDA and experimented using synthetic data with different sizes. In particular, CUDA kernels were implemented to compute a Type-I 2-BS: the 2-point correlation function (2-PCF). The 2-PCF requires computation of all pairwise Euclidean distances and the output is of very small size: one scalar describing the number of points within a radius. The 2-PCF is a good example here because the work is almost exclusively on the distance computation. The experiments were run in a workstation running Linux (Ubuntu 14.04 LTS) with an Intel Xeon CPU E5-2620 v3, 64 GB of DDR3 1333-MHz memory and an NVIDIA TITAN® XP GPU with 12 GB of global memory. This workstation is also the platform used for other experiments reported throughout this disclosure. The following kernel functions were implemented and compared to the different solutions mentioned above: (1) SHM-SHM: caching both blocks L and R in shared memory; (2) Register-SHM: caching one datum in register and block R in shared memory; (3) Register-RoC: placing one datum in register and block R in read-only cache; and we also compare with (4) Naive: generic GPU-Based 2-BS algorithm as shown in Algorithm 1. Note that all of the kernels except Naive kernel, the input variable is vectorized by float2. In addition, the naïve kernel is compiled by −Xptxa-dlcm=ca flag, which enabled compiler to use L1 cache.

Experiments were performed on input data size ranging from 512 to 3 million particles. Particle coordinates are generated following a uniform distribution in a region. For kernel parameters, the total number of threads was set as the data size and the value of threads per block to 512, which is derived from an optimization model. The model guarantees best kernel performance among all possible parameters by minimize running round (e.g., number of round all the specified threads of a kernel are actually scheduled). The model also shows that running round is limited by three factor—that are shared memory usage, register usage, and number of concurrent warp. Because the kernel in 2-PCF uses small amount of these three factor, large block sizes of the kernel (e.g., 512 thread per block) can be used to achieve the best performance.

Figure 2:
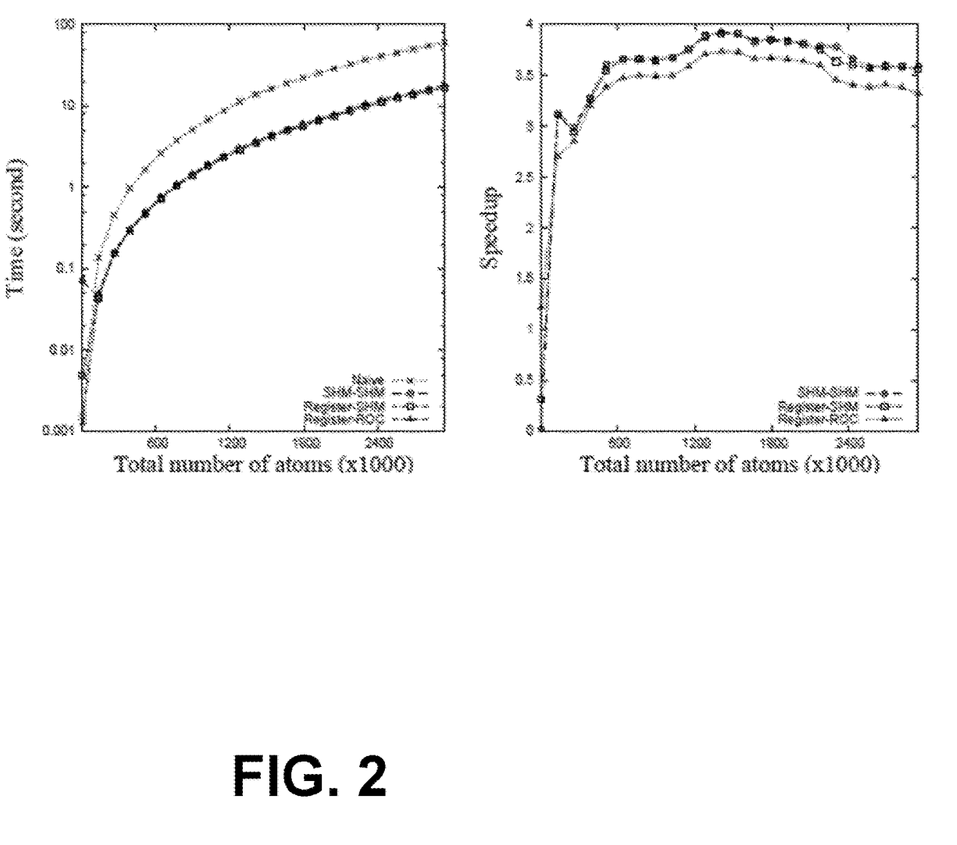
FIG. 2 is a drawing depicting experimental results according to various embodiments of the present disclosure.

FIG. 2 shows the total running time of each experimental run. It is observed that the running time grows with data size in a quadratic manner, which is consistent with the $O(N^2)$ complexity of such algorithms. Among all tested parallel algorithms, the Register-SHM and the SHM-SHM kernel shows similar results, which is the best performance under all data sizes—it achieves an average speedup of 3.9× (maximum speedup of 3.5×). The Register-RoC kernel shows the least improvement over the naïve algorithm, with an average speedup of 3.3× and maximum speedup of 3.7×. The results are in conformity with the proposed caching solutions.

To evaluate the level of optimization achieved, the utilization of GPU resources was analyzed. Normally, the bottleneck is on the memory bandwidth in processing 2-BSs such as the 2-PCF, due to the simple calculations in the distance function. If the cores can be fed with sufficient data, the cores will show a high utilization, which indicates the code is highly optimized. Another way to look at it is that since the total number of distance function calls is the same for all algorithms mentioned thus far, the less idling time the cores experience, the better performance the algorithm has. Table 2 shows utilization of different hardware units.

TABLE 2

| Kernel | GPU Cotes | | | Memory Bandwidth | | |
|---|---|---|---|---|---|---|
| | Ari | Con | Mem | SHM | L2 | ROC |
| Naive | 20% | 5% | 15% | 10% | 90% | 40% |
| SHM-SHM | 67% | 14% | 4% | 20% | 10% | 10% |
| Reg-SHM | 68% | 14% | 4% | 20% | 10% | 10% |
| Reg-RoC | 55% | 12% | 12% | 10% | 20% | 50% |

Various embodiments of the present disclosure also involve techniques to efficiently output the results from GPUs in 2-BS computing. Depending on the features of data output, the design strategy on this stage can be different for various 2-BSs. The simplest type is that each thread omits a very small amount of output (e.g., Type-I), such as simply using automatic (local) variable(s) to store an active copy of the output data in registers, and transmit such data back to host when kernel exits. For problems with medium-sized output (e.g., Type-II), shared memory can be used to cache the output. Data privatization techniques can be used to handle these output. For problems with very large output size (e.g., Type-III), results have to be output directly to global memory. The main problem for using global memory for output is the synchronization required by supporting different threads write into the same memory location. To avoid incorrect results, atomic instructions are used in GPUs to have protected accesses to (global) memory locations. In frameworks such as CUDA, such protected memory location is not cached and obviously cannot be accessed in a parallel way. Therefore, it renders very high performance penalty to use atomic instructions when threads frequently access the same memory address. For that, a direct output buffer mechanism can be used to minimize such costs. Note that our paper focuses on 64-bit output data type.

Figure 3:
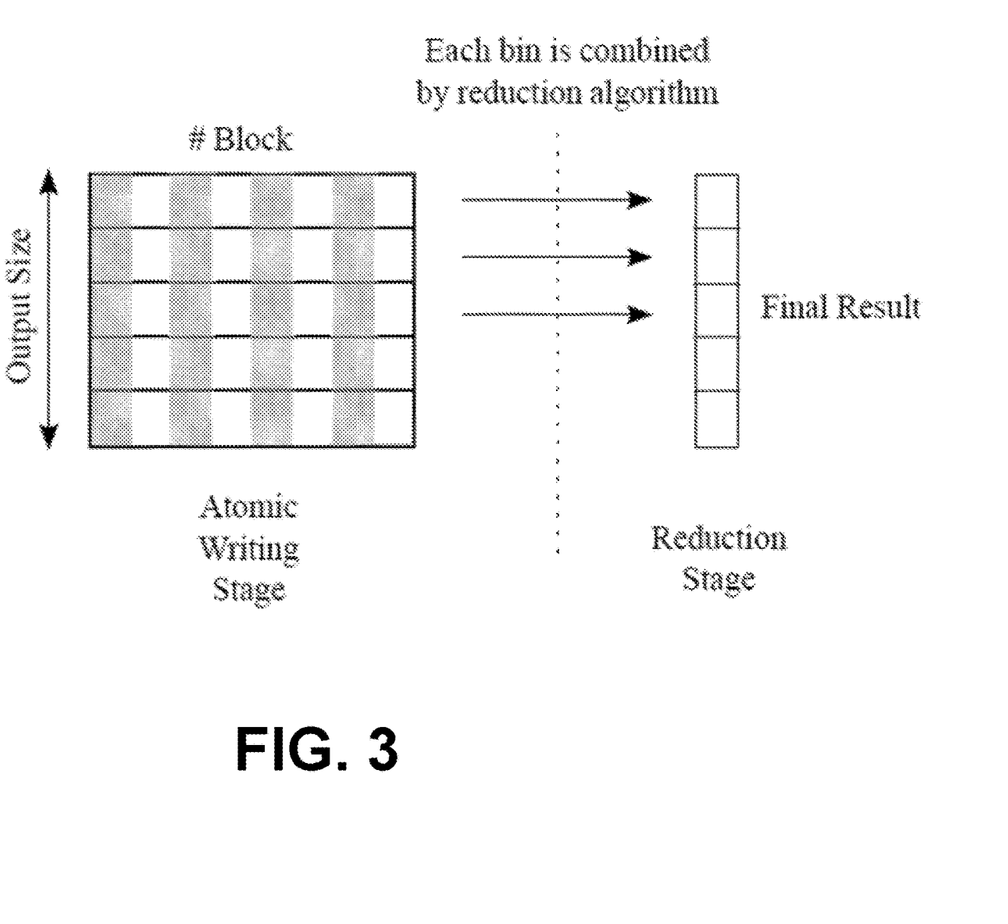
FIG. 3 is a drawing depicting one of several embodiments of the present disclosure.

Data privatization is frequently used in parallel algorithms to reduce synchronization. For problems addressed by the present disclosure, private copies of the output data structure can be stored to be used by a subset of the threads in the on-chip cache of GPUs. The RoC cannot be used here since it cannot be overwritten during the lifespan of the kernel. That leaves the shared memory the only choice. By this design, the data output is done in two stages: (1) whenever the distance function generates a new distance value, it is used to update the corresponding location of the private output data structure via an atomic write. Although this still involves an atomic operation, the high bandwidth of shared memory ensures minimum overhead; (2) when all distance functions are computed, the multiple private copies of the output array are combined to generate the final output (FIG. 3). It can be assumed that the final output can be generated using a parallel reduction algorithm such as the one presented in CUDA thrust library. Algorithm 3 shows a new version of Algorithm 2 enhanced by the output privatization technique.

---
Algorithm 3: SDH with Output Privatization
---

Local Var: t (Thread id), b (Block id)
Global Var: B (Block size), M (total number of blocks)
1: SHMOut ← Initialize shared memory to zero
2: reg ← the t-th datum of b-th input data block
3: for i = b + 1 to M do
4:   R ← the i-th input data block loaded to cache
5:   syncthreads( )
6:   for j = 0 to B do
7:     d ← DisFunction(reg, R[j])
8:     atomicAdd(SHMOut[d] , 1)
9:   end for
10: end for
11: L ← the b-th input data block loaded to cache
12: for i = t + 1 to B do
13:   d ← DisFunction(reg, L[i])
14:   atomicAdd(SHMOut[d] , 1)
15: end for
16: syncthreads( )
17: Output[b][t] ← SHMOut[t]

In an initial implementation, one private copy of the output for each thread block was used. By this, synchronization only happens within a thread block, and the bandwidth of the shared memory can effectively hide the performance overhead. In the output reduction phase, private outputs on shared memory are first copied (in parallel) to global memory, which is in global scope and can be accessed by other kernels. Then a reduction kernel is launched to combine the results into a final version of output array. This kernel is configured to have one thread handle one element in the output array.

Here an analytical model of the performance during the process of output writing is also presented. The cost in the naive algorithm is $N^2 C_{GAc}$. Because the latency $C_{GAc}$ is high, the naive algorithm is heavily bound by the time of writing output. In the privatization-based algorithm, there are two stages in output writing: the update stage and reduction stage. In the update stage, the cost of memory access is:

$$\sum_{i=1}^{M} (N + B - i) C_{ShmAc} \quad (5)$$

and that in the reduction stage is:

$$H_S[M(C_{GW} + C_{ShmR} + C_{GR}) + C_{GW}] \quad (6)$$

Via the privatization technique, the number of accesses to global memory drops significantly from the naive algorithm. Specifically, the naive algorithm needs to access global memory every time a result is generated from pairwise computation, but privatization requires access only in the reduction stage. Such a number decreases from $N^2$ to $H_S[2M+1]$. Reading and writing to global memory without atomic instructions occurs in the reduction stage. In addition, the atomic writes are done in shared memory, which bears a much lower overhead. Therefore, writing private outputs can significantly outperform the naive algorithm.

So a privatization method in which one private copy of the output is used per thread block has been presented. Note that synchronization still exists when different threads in the block write into the same output address. If the output size is small enough to allow multiple private copies for the same block of threads, the probability of collision in atomic operations will decrease, leading to better efficiency of parallelization. To realize this, there are two problems to solve: (1) how to assign threads (within a block) to the multiple private copies; and (2) how to determine the exact number of required copies.

As to the first problem, it is natural to assign threads with continuous thread IDs to a copy of temporary output. For example, with two private copies in each threads block of size B, threads with IDs in [0,B/2) share the first copy and those with IDs in [B/2,B) access the second copy. However, this approach does not further improve the performance of the kernel. This is due to the run-time thread scheduling policy in GPGPU frameworks. For example, in CUDA, every 32 threads with consecutive IDs (called a warp) is the basic scheduling unit. In other words, only threads in the same warp are guaranteed to run at the same time thus face the penalty of collision due to atomic operations. Threads in different warps do not suffer from this issue; thus, assigning them to different output copies does not help. Therefore, one approach is to assign threads with the same offset of IDs in the warp to an output copy. Going back to the previous example, threads can be assigned with even-numbered IDs in all warps to share the first output copy and those with odd-numbered IDs to the second copy. Algorithm 4 show details of this enhanced method: each private output is shared by threads whose IDs have the same 5 least significant bits (called laneID). Upon completing a distance computation, each thread updates its corresponding copy of the output (line 5).

| Algorithm 4: 2-BS with Advanced Output Privatization |
|---|
| Local Var: t (Thread id), b (Block id), l (lane id)<br>Global Var: $H_{size}$ (Output size), $H_{num}$ (number of private copies)<br>1: laneID = t & 0x1f<br>2: initial Output<br>3: for each pair of pairwise computation do<br>4:    x ← 2-BS Computation Stage<br>5:    atomic update Output[$H_{size}$ * (laneID%$H_{num}$) + x]<br>6: end for<br>7: Output Reduction Stage |

The second problem (e.g., finding the best number of private outputs per block) is non-trivial: more copies will decrease the chance of collision in atomic writes, but may decrease the number of threads running simultaneously due to the limited size of shared memory. Starting with the following performance model for compute-intensive kernels:

$$R = \left\lceil \frac{T}{\alpha \times M_P} \right\rceil \quad (7)$$

where R is the number of rounds that takes to schedule all thread blocks in the hardware, T=M×B is the total number of threads, a is the number of threads that can be run in each round in a single multiprocessor (a.k.a. thread occupancy), and $M_P$ is the total number of multiprocessors in a GPU. Note that frameworks such as CUDA allow a large number of blocks to be launched yet there are only a small number of (e.g., 30 in a Titan XP) multiprocessors in a GPU device. Thus, the number of rounds is obviously determined by the occupancy, as all other quantities in Equation 7 are constants. The occupancy, in turn, is affected by the use of common resources for each block, which in in this case is shared memory and is determined by the number of private output copies. The occupancy calculated from the model is plotted in FIG. 4. As illustrated, kernel occupancy drops dramatically with the increase of number of copies and output size. Based on such results, an analytical model can be developed.

Letting L be the latency of running a single round, R×L is then the total kernel running time. In this case, latency is dominated by the time each thread idles due to the conflict of atomic operations. Let k denote the number of threads sharing the same private output in a warp (thus causing a conflict), latency can be then defined as a function of k $$L(k, C_L) = \begin{cases} C_L & k=1 \\ p_k C_L + (1-p_k) P & k>1 \end{cases} \quad (8)$$

Specifically, if each thread in a warp has its own private output (k=1), there should be no conflict. The latency is denoted under this (ideal) situation as $C_L$. If multiple threads share a private output, latency is determined by the probability of seeing a collision-free warp ($p_k$) and a penalty of collision P, which can be defined as $$P = L(k-1, C_L + C_{LP}) \quad (9)$$

In other words, L becomes a recursive function defined over a higher latency time $C_L + C_{LP}$ and fewer conflicting threads k−1. Again, $p_k$ is the probability that all threads in the same warp access different address locations in the outputs. This can be modeled as a classic birthday problem, resulting in:

$$p_k = \frac{H_S - 1}{H_S} \times \frac{H_S - 2}{H_S} \times \frac{H_S - 3}{H_S} \times \ldots \times \frac{H_S - (k-1)}{H_S} \quad (10)$$

This says that the first thread can update any address, the second thread can update any address except the first thread's output address, and so on. By using Taylor series expansion of $e^x$, the expression approximates to:

$$p_k \approx e^{\frac{-k(k-1)}{2H_S}} \quad (11)$$

Figure 4:
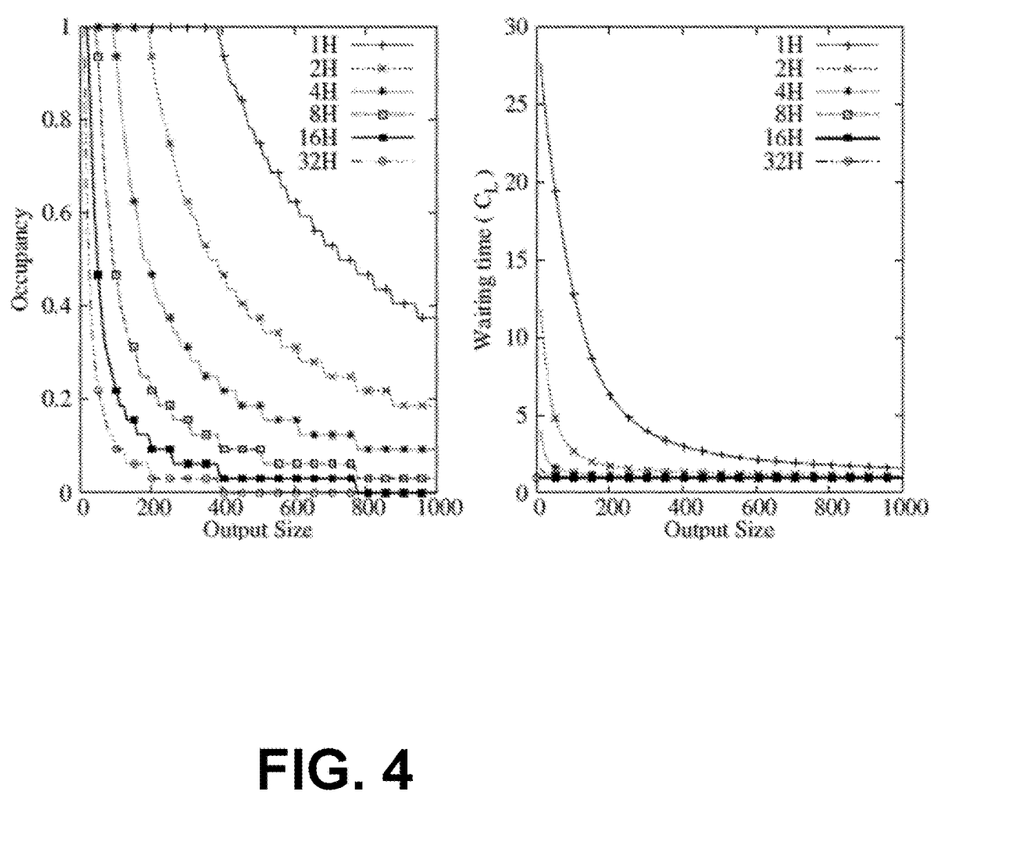
FIG. 4 is a drawing depicting experimental results according to various embodiments of the present disclosure.

FIG. 4 also shows latency derived from our model under various values of k and $H_S$. Note that the latency data plotted here is of unit $C_L$ instead of absolute time in seconds. Here $C_L$ is a hardware-specific value that can be obtained via experiments. As shown, the latency decreases when there are more private copies of outputs. In case of only a single output (1H), and when the output size is small the latency time becomes very high. As a side note, the output size plays a role in both sides of FIG. 4: with the increase of output size, lower occupancy (due to higher shared memory consumption) and lower latency (due to less conflict in accessing the output) result.

With the above model, we can find the optimal number of private copies. Given any output size (this is a user-specified parameter for a 2-BS problem), different values of k can be used to solve both Equations (7) and (8) to get the estimated total running time. Luckily, k is an integer ranging from 1 to 32 (e.g., CUDA warp size), all such k values can be evaluated to find one that leads to the best running time.

Other techniques can be used to handle a common problem in Type-III 2-BSs: allocating GPU (global) memory for output whose size is unknown when the kernel is launched. The problem is due to the fact that some GPGPU frameworks, such as CUDA, only allow memory allocation for data with a static size. Such a problem has been a real difficulty for not only 2-BS computation but many other parallel computing patterns as well. A typical solution is to run the same kernel twice—the first time is for determining the output size only, and the memory for output is actually allocated and updated in the second run. However, this imposes a waste of time and other resources on the user.

A buffer management mechanism can be used to handle unknown output size. This design only requires one single run of the kernel, with very little synchronization among threads. First, an output buffer pool with a fixed size is allocated. Then, it is divided into small chunks called pages. A global pointer GP that holds the position of the first available page in the buffer pool is kept. Each thread starts with one page and fills the page with output by keeping its own pointer to empty space in that page. Once the page is filled, the thread acquires a new page pointed to by GP via an atomic operation. By using this mechanism, conflicts among threads remains minimal because GP is only updated when a page is filled. Algorithm 5 shows the 2-BS algorithm augmented with this mechanism.

| Algorithm 5: 2-BS with Direct Output Buffer |
|---|
| Local Var: buf (current buffer page), count (page usage)<br>Global Var: GP (next free page), b (Page size)<br>1: buf ← atomicAdd(GP, b)<br>2: count ← 0<br>3: for each pair of pairwise computation do |

| Algorithm 5: 2-BS with Direct Output Buffer |
| --- |
| 4:    x ← 2-BS Computation Stage |
| 5:    buf[count++] ← x |
| 6:    if count == b then |
| 7:        buf ← atomicAdd(GP, b) |
| 8:    end if |
| 9: end for |

The algorithm starts from initializing local buffer pointer by using atomic add operation from global buffer pool and set count to 0 (lines 1 and 2). Then, the algorithm adds each update to local buffer page (line 5). If local buffer page is filled, the algorithm requests a new page by another atomic operation (line 7). The GP pointer, although defined in global memory, will be most likely cached at runtime therefore its accesses generate very little overhead.

There are also two additional techniques could help increase the performance of 2-BS programs. The first is a load-balancing technique. The second is a tiling technique with shuffle instructions.

Code divergence is the situation when different threads follow different execution paths in an SIMD architecture. As a result, such threads will be executed in a sequential manner and that leads to performance penalties. In CUDA, since the basic scheduling unit is a warp (of 32 threads), only divergence within a warp will be an issue. As illustrated by Algorithm 2, the kernel will only suffer from divergence in the intra-block distance function computation (line 10 to 13 in Algorithm 2). This is because each thread goes through a different number of iterations. Here, a load balancing method can be introduced to eliminate divergence from the intra block computation. As mentioned before, divergence occurs because the workload on each thread is different. The load-balancing technique thus enforces each thread to compute the same amount of work, e.g., half of the block size. Previously, for a thread with index i in a block (thus i∈[0, B−1]), the total number of datum it pairs with is [B−1−i], meaning that every thread has a different number of datum to process, and this leads to divergence everywhere. With the load-balancing technique, each thread can pair with B/2 datum. In particular, at iteration j, the thread with index i pairs with datum with index (i+j) % B. Note that, in the last iteration, only the lower half of all threads in a block needs to compute the output. This does not cause a divergence as the block size is a multiple of warp size.

As seen previously, tiling via shared memory or RoC is a technique to improve performance of Type-I 2-BS programs. However, under some circumstances, both the shared memory and RoC may not be available for the use of 2-BS kernels. For example, they could be used for other concurrent kernels as a part of a complex application. A tiling technique with shuffle instructions can therefore be used to relieve the dependency on cache. Note that register content is generally regarded as private information to individual threads. However, the shuffle instruction introduced in recent versions of CUDA (and similar instructions in other GPGPU frameworks) allows sharing of register content among all threads in the same warp or similar data structure. Therefore, Algorithm 2 can be augmented using shuffle instructions, as illustrated in the pseudocode in Algorithm 6 below.

| Algorithm 6: Block-based 2-BS with shuffle instruction |
| --- |
| Local Var: t (Thread id), b (Block id), W (warp size) |
| Global Var: B (Block size), M (total number of blocks) |
| 1:  reg0 ← the t-th datum of b-th input data block |
| 2:  for i = b + 1 to M do |
| 3:    for j = t%W to B; j+=W do |
| 4:      reg1 ← the j-th datum of i-th input data block |
| 5:      for k = 0 to W do |
| 6:        regtmp ← reg1 broadcasted from the k-th thread |
| 7:        d ← DisFunction(reg0, regtmp) |
| 8:        update output with d |
| 9:      end for |
| 10:    end for |
| 11: end for |

Figure 5:
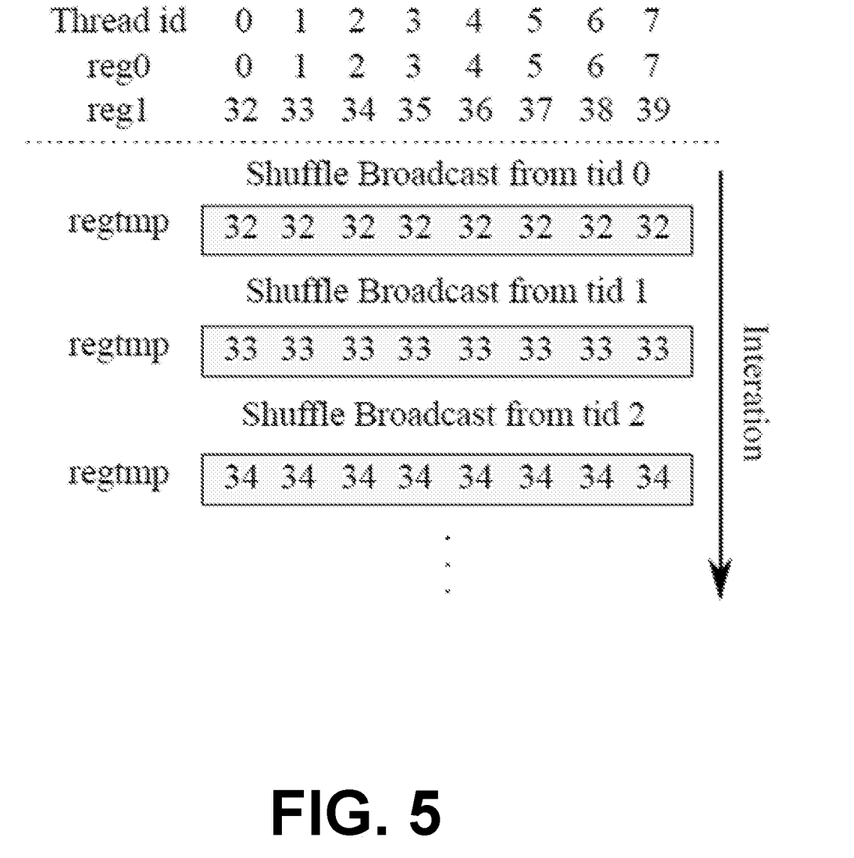
FIG. 5 is a drawing depicting various embodiments of the present disclosure.

In particular, three registers are allocated to store input data: reg0 (line 1) is used to store datum from L which is the same as algorithm 2; reg1 (line 4) is used to store datum from R and changes after every 32 iterations; regtmp (line 6) is a temporary variable, which updates every iteration with shuffle instruction. Each thread can load a datum to reg1 (line 4). Then, in each iteration, a shuffle broadcast instruction is used to load data from other thread's register (line 6) to regtmp. After regtmp value becomes valid, reg0 and regtmp can be used to calculate distances (line 7). FIG. 5 shows an example. Note that this method requires only two more registers and does not require shared memory or read-only cache.

So far, solutions to the 2-BS problem have been presented assuming the GPU global memory is big enough to contain all input data as well as program states. In fact, the 10 GB-level global memory in a typical GPU can hold input data big enough to keep the GPU busy for a long time due to the quadratic nature of 2-BS computing. However, it is still meaningful to study algorithms that handle large datasets with sizes greater than that of the global memory.

To address large datasets with sizes greater than that of the global memory, one can first divide the input data into small blocks that can fit into GPU global memory, and execute the best algorithm we have developed so far for each pair of input data blocks sitting in global memory. The results of each pair of data blocks are then aggregated towards computing of the final result. It is well known that data transmission in/out GPU carries significant overhead due to the limited bandwidth of the PCI-E bus. In small-data algorithms, the input data only needs to be shipped into the GPU once, this translates into a linear overhead that can be overshadowed by the quadratic on-board computational time. With the large data inputs, every pair of data blocks will have to be transmitted to the GPU. If the data has to be partitioned into k blocks, we essentially have to ship $O(k^2)$ pairs of blocks. Therefore, an optimization goal here is to reduce the data shipping overhead.

The strategy is to hide the data transmission latency behind the GPU processing of the in situ data blocks. In CUDA, data transmission in/out of GPU is asynchronous therefore execution of concurrent kernels allows data transmission and in-core computation to be done at the same time. The mechanism for concurrent kernel execution is called CUDA Streams: a CUDA stream is basically a series of GPU operations (e.g., I/O, kernel execution) that have to follow a fixed order. However, kernels belonging to different CUDA streams can be executed concurrently: when input data is being transmitted in Stream 1, the 2-BS kernel in Stream 2 can run. For each pair of input data blocks, if the kernel running time is longer than data transmission time, the latter can be effectively hidden.

Apart from allowing 2-BS to be computed for large data inputs, the above approach provides an effective way to scale up the algorithm. Since all pairs of input data blocks can be processed independently, our method can be easily applied to a multi-GPU environment, in which each GPU can work on a different set of input data blocks.

A special note here is: the way to combine outputs from different block-level runs depends on the type of 2-BS. For Type-I and Type-II, the results can be combined inside each GPU via parallel reduction when any pair of data blocks are processed. For Type-III, due to the use of direct output buffer, no action is needed to combine output within the GPU. To handle new chunks output, threads just require to acquire a new page from the Global Pointer. After GPU devices complete computation of all data blocks, they transfer output back to the host. At the end, the host combines all device-level outputs into the final output.

While there are a number of techniques to optimize 2-BS code on GPUs according to various embodiments of the present disclosure, different techniques are effective at different stages of different 2-BS problems. For those with new 2-BS problems with arbitrary characteristics, development of efficient code is still challenging. Accordingly, some embodiments of the present disclosure can involve a framework that encapsulates all aforementioned techniques and automatically generates optimized GPU code for user-defined 2-BS problems. To develop code for a new 2-BS problem, the framework uses at least the following inputs: (1) a distance function; (2) information about the type, number of dimensions of the input data and the number (1 or 2) of input datasets; (3) an output data structure and its (estimated) size; and (4) specifications of the target GPU device. Based on such information, the framework can outputs almost complete CUDA kernels that reflect the optimized strategy for computing the given 2-BS. In some embodiments, the framework can also output code for other GPGPU frameworks.

Figure 6:
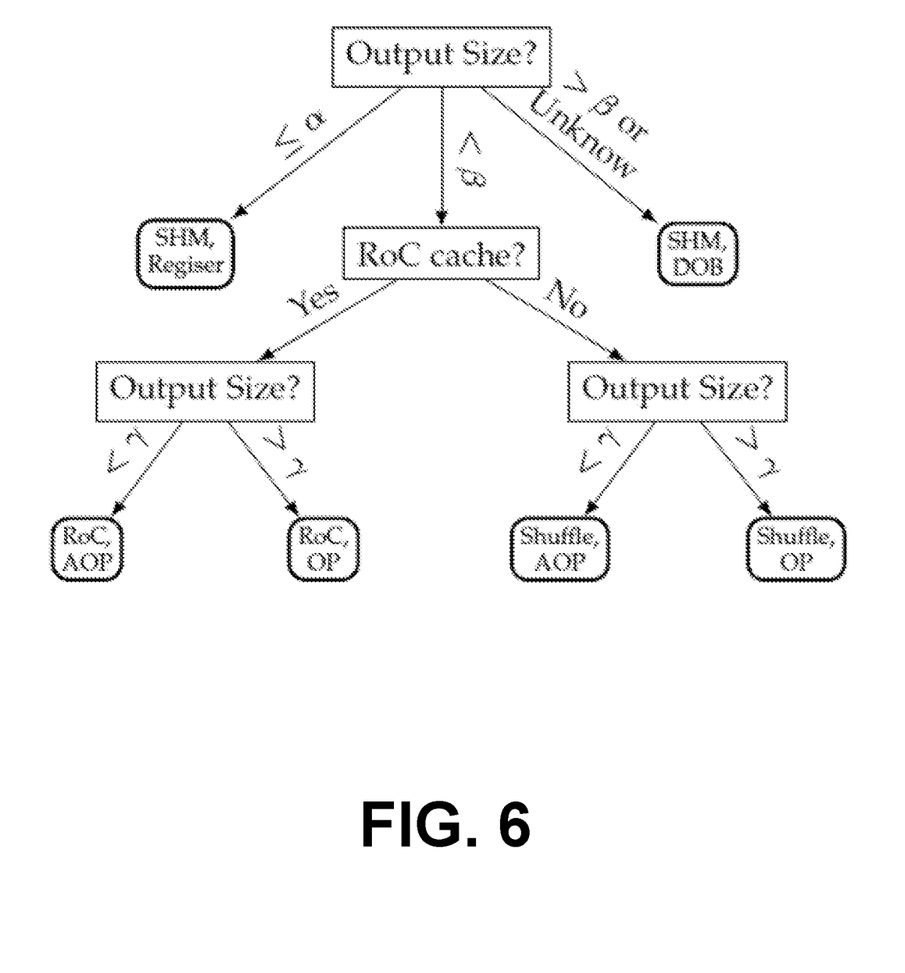
FIG. 6 is a drawing depicting various embodiments of the present disclosure.

The disclosed framework stores chunks of template code reflecting the individual techniques mentioned above as well as the models developed for kernel optimization. In addition, a rule-based engine that integrates different chunks of code into executable CUDA kernels can be used. For example, some components of the rule-based engine are about decision-making with the different sizes of the output data. This can be seen as a decision tree in FIG. 6. If output size is tiny or equal to a threshold $\alpha$ (e.g., Type-I), the code will be generated based on caching inputs into shared memory and outputs into registers. Otherwise, if output size is larger than a threshold value $\beta$ or unknown (e.g., Type-III), the code will cache inputs in shared memory and use a direct buffer to handle output. For Type-II problems, the framework will check available RoC size. If there is enough RoC to hold input data, RoC will be used as input cache. Otherwise, shuffle instructions will be used for caching input data. Then the output size is checked again, if output size is greater than a threshold $\gamma$, regular output privatization will be used. Otherwise, warp-level output privatization will be used. The thresholds are set as follows: set $\alpha$ to the size of the largest primitive type (e.g., float4, int4) supported by the GPGPU framework (e.g., CUDA). This is because anything larger than that (e.g., an array) will be placed in global memory. Then set $\beta$ to the size of shared memory (e.g., 64K for PASCAL architectures). $\gamma$ is given by the modeling results shown in Table 4, reproduced below:

TABLE 4

Number of private copies H and the range of output size for which H is found to be the optimal choice

| Number of copies | Theoretical Results | Actual Results |
|---|---|---|
| 32 | 1-10 | 1-10 |
| 16 | 11-50 | 11-35 |
| 8 | 31-65 | 36-92 |
| 4 | 66-150 | 93-152 |
| 2 | 151-450 | 153-300 |
| 1 | >450 | >300 |

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system for solving two-body statistics (2-BS) problems with a graphics processing unit (GPU), comprising:
    memory and the GPU;
    machine readable instructions stored in the memory that, when executed by the GPU, cause the system to at least:
        load a first input data block from the memory into a first cache region of the GPU, the first input data block comprising a first array of values;
        load a second input data block from the memory into a second cache region of the GPU, the second input data block comprising a second array of values;
        compute a distance function between each value in the first data block and each value in the second data block;
        allocate a buffer in the memory;
        divide the buffer into a plurality of pages;
        assign a first page of the plurality of pages to a first thread that computes the distance function;
        assign a second page of the plurality of pages to a second thread;
        initialize a global pointer that references a position of an available page of the plurality of pages;
        in response to one of the plurality of pages becoming full, assign the available page to the thread associated with the page that became full; and
        update the global pointer to reference a position of a next available page of the plurality of pages.

2. The system of claim 1, wherein the machine readable instructions that cause the system to compute the distance function between each value in the first data block and each value in the second data block further cause the system to at least:
    load a value from the first array of values into a register of the GPU; and compute the distance function between the value in the register of the GPU and each value in the second data block.

3. The system of claim 1, wherein the distance function is provided as an input to the machine readable instructions.

4. The system of claim 1, wherein the distance function is a first distance function and the machine readable instructions stored in the memory, when executed by the GPU, further cause the system to at least:
load a third input data block from the memory into a third cache region, the third input block comprising a third array of values; and
concurrently compute:
the first distance function between each value in the first data block and each value in the second data block; and
a second distance function between each value in the first data block and each value in the third data block.

5. The system of claim 1, wherein the machine readable instructions stored in the memory, when executed by the GPU, further cause the system to at least:
load a third input data block from the memory into a third cache region, the third input block comprising a third array of values; and
compute the distance function between each value in the first data block and each value in the third data block using the second thread.

6. The system of claim 1, wherein the first input data block is selected from a first data set and the second input data block is selected from a second data set.

7. A method for solving two-body statistics (2-BS) problems with a graphics processing unit (GPU), comprising:
loading a first input data block from memory into a first cache region of the GPU, the first input data block comprising a first array of values;
loading a second input data block from the memory into a second cache region of the GPU, the second input data block comprising a second array of values;
computing a distance function between each value in the first data block and each value in the second data block;
allocating a buffer in the memory;
dividing the buffer into a plurality of pages;
assigning a first page of the plurality of pages to a first thread that computes the distance function;
assigning a second page of the plurality of pages to a second thread;
initializing a global pointer that references a position of an available page of the plurality of pages;
in response to one of the plurality of pages becoming full, assigning the available page to the thread associated with the page that became full; and
updating the global pointer to reference a position of a next available page of the plurality of pages.

8. The method of claim 7, wherein computing the distance function between each value in the first data block and each value in the second data block further comprises:
loading a value from the first array of values into a register of the GPU; and
computing the distance function between the value in the register of the GPU and each value in the second data block.

9. The method of claim 7, further comprising receiving the distance function as an input provided by a user.

10. The method of claim 7, wherein the distance function is a first distance function and the method further comprises:
loading a third input data block from the memory into a third cache region, the third input block comprising a third array of values; and
concurrently computing:
the first distance function between each value in the first data block and each value in the second data block; and
a second distance function between each value in the first data block and each value in the third data block.

11. The method of claim 7, further comprising:
loading a third input data block from the memory into a third cache region, the third input block comprising a third array of values; and
computing the distance function between each value in the first data block and each value in the third data block using the second thread.

12. The method of claim 7, wherein the first input data block is selected from a first data set and the second input data block is selected from a second data set.

13. A non-transitory, computer-readable medium comprising machine-readable instructions that, when executed by a processor of a computing device, cause the computing device to at least:
load a first input data block from memory into a first cache region of a Graphics Processing Unit (GPU), the first input data block comprising a first array of values;
loading a second input data block from the memory into a second cache region of the GPU, the second input data block comprising a second array of values;
computing a distance function between each value in the first data block and each value in the second data block;
allocate a buffer in the memory;
divide the buffer into a plurality of pages;
assign a first page of the plurality of pages to a first thread that computes the distance function;
assign a second page of the plurality of pages to a second thread;
initialize a global pointer that references a position of an available page of the plurality of pages;
in response to one of the plurality of pages becoming full, assign the available page to the thread associated with the page that became full; and
update the global pointer to reference a position of a next available page of the plurality of pages.

14. The non-transitory, computer-readable medium of claim 13, wherein the machine-readable instructions that cause the computing device to compute the distance function between each value in the first data block and each value in the second data block further cause the computing device to at least:
load a value from the first array of values into a register of the GPU; and
compute the distance function between the value in the register of the GPU and each value in the second data block.

15. The non-transitory, computer-readable medium of claim 13, wherein the machine-readable instructions further cause the computing device to receive the distance function as an input provided by a user.

16. The non-transitory, computer-readable medium of claim 13, wherein the distance function is a first distance function and the machine-readable instructions, when executed by the processor, further cause the computing device to at least:
load a third input data block from the memory into a third cache region, the third input block comprising a third array of values; and concurrently compute:
- the first distance function between each value in the first data block and each value in the second data block; and
- a second distance function between each value in the first data block and each value in the third data block.

17. The non-transitory, computer-readable medium of claim 13, wherein the machine-readable instructions, when executed by the processor, further cause the computing device to at least:
- load a third input data block from the memory into a third cache region, the third input block comprising a third array of values; and
- compute the distance function between each value in the first data block and each value in the third data block using the second thread.

18. The non-transitory, computer-readable medium of claim 13, wherein the first input data block is selected from a first data set and the second input data block is selected from a second data set.

* * * * *